(12) United States Patent
Hu

(10) Patent No.: US 7,835,388 B2
(45) Date of Patent: Nov. 16, 2010

(54) COMMUNICATION METHOD FOR INTERWORKING OF LOCAL HETEROGENEOUS LINK LAYER PROTOCOLS AND APPARATUS THEREOF

(75) Inventor: Chunzhe Hu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 445 days.

(21) Appl. No.: 11/620,891

(22) Filed: Jan. 8, 2007

(65) Prior Publication Data

US 2007/0147400 A1    Jun. 28, 2007

Related U.S. Application Data

(63) Continuation of application No. PCT/CN2006/000205, filed on Feb. 6, 2006.

(30) Foreign Application Priority Data

Feb. 6, 2005    (CN) ................... 2005 1 0007249

(51) Int. Cl.
*H04J 3/00* (2006.01)
(52) U.S. Cl. ................................... 370/464
(58) Field of Classification Search ............ None
See application file for complete search history.

(56) References Cited

U.S. PATENT DOCUMENTS

| 6,678,283 | B1 * | 1/2004 | Teplitsky | ............ 370/463 |
|---|---|---|---|---|
| 7,149,217 | B2 | 12/2006 | Alexander et al. | |
| 2004/0090971 | A1* | 5/2004 | Anderson, IV | ............ 370/401 |
| 2004/0151181 | A1* | 8/2004 | Chu et al. | ............ 370/392 |
| 2004/0258073 | A1 | 12/2004 | Alexander et al. | |
| 2006/0146710 | A1* | 7/2006 | Roy | ............ 370/235 |
| 2007/0258444 | A1* | 11/2007 | He | ............ 370/389 |

FOREIGN PATENT DOCUMENTS

| CN | 1468007 A | 1/2004 |
|---|---|---|
| JP | 2002-281060 A | 9/2002 |

* cited by examiner

*Primary Examiner*—Chi H Pham
*Assistant Examiner*—Fan Ng
(74) *Attorney, Agent, or Firm*—Leydig, Voit & Mayer, Ltd.

(57) ABSTRACT

A communication method for interworking of local heterogeneous link protocols, includes the following steps: when the type of an input interface of a data packet is a predefined type, remove link layer information of the data packet according to a link protocol of the input interface; transmit the data packet to an output interface; a Provider Edge (PE) encapsulates the data packet according to a link protocol of the output interface and transmits the encapsulated data packet through the output interface. The present invention also discloses a communication apparatus for interworking of local heterogeneous link protocols, including: an input interface, an output interface and a data processor. The present invention processes data packets from specific interfaces and directly transmits the data packets to output interfaces, thereby implementing the interworking of local heterogeneous link layer protocols and smooth upgrading of networks.

14 Claims, 2 Drawing Sheets

COMMUNICATION METHOD FOR INTERWORKING OF LOCAL HETEROGENEOUS LINK LAYER PROTOCOLS AND APPARATUS THEREOF

This application is a continuation of International Patent Application No. PCT/CN2006/000205, filed Feb. 6, 2006, which claims priority to Chinese Patent Application No. 200510007249.6, filed Feb. 6, 2005, all of which are hereby incorporated by reference.

FIELD OF THE TECHNOLOGY

The present invention relates to switching technologies in network communications, more particularly to a communication method and an apparatus for interworking of local heterogeneous link layer protocols.

BACKGROUND OF THE INVENTION

Layer 2 Virtual Private Network (VPN) technique based on Multi Protocol Label Switching (MPLS) (shortened hereinafter as MPLS L2VPN) can provide Internet Protocol (IP) services and Layer 2 VPN services simultaneously in one network, in which any rate can be set conveniently and the configuration is simple.

In the conventional MPLS L2VPN architecture, interworking of different Provider Edge (PE) equipment through heterogeneous link layer protocols is implemented to transmit data packets. At present, an IP-interworking technique between remote ends is adopted to implement the heterogeneous link layer protocol interworking in the MPLS L2 VPN. The Internet Engineering Task Force (IETF) defines a scheme of the IP-interworking in draft-kompella-ppvpn-12vpn-02 and draft-martini-12circuit-trans-mpls-09. The scheme implements the IP-interworking under heterogeneous link layer protocols by a negotiation between a local PE and a Customer Edge (CE) through a control plane, wherein, Asynchronous Transfer Mode (ATM) and Frame Relay (FR) are taken as layer 2 protocols for the links that two PEs access, respectively, and IP is taken as the network protocol for both links.

During reconstructions of old networks and upgrading of some old networks, networks of heterogeneous link layer protocols may be encountered by some enterprise users. For example, an enterprise has two CEs, and both of them adopt FR low-rate links to connect with each other through a PE previously. At present, one of the CEs is upgraded to the ATM high-rate link while the other desires to remain with the low-rate link. For the enterprise, the interworking of the heterogeneous link layer protocols is thus required for convenience. In addition, the interworking of the heterogeneous link layer protocols may facilitate the smooth upgrading of the network.

The interworking of homogeneous link protocols on local equipment can be implemented by a protocol defined in draft-kompella-ppvpn-12vpn-02, or Circuit Cross Connect (CCC).

However, the inventor found: since Border Gateway Protocol (BGP) cannot accommodate heterogeneous links in one VPN, the BGP can not support the interworking of local heterogeneous link protocols. In addition, CCC is a bridge equipment similar to local layer 2 switch and cannot translate different link-layer protocols, so the interworking of local heterogeneous link protocols cannot be implemented, either. Meanwhile, without the interworking of local heterogeneous link protocols, smooth upgrading of the network can not be achieved.

SUMMARY OF THE INVENTION

One embodiment of the present invention provides a communication method and an apparatus for interworking of local heterogeneous link layer protocols so as to implement interworking of local heterogeneous link layer protocols.

According to an embodiment of the present invention, the communication apparatus for interworking of local heterogeneous link layer protocols includes:

an input interface, configured to receive a data packet, connected with a first link which adopts a first link protocol;

an output interface, configured to transmit the data packet, connected with a second link which adopts a second link protocol;

a data processor, connected with the input interface and the output interface, configured to process the data packet between the input interface and the output interface according to types of the input interface and the output interface.

Another embodiment of the present invention provides a communication method for interworking of local heterogeneous link layer protocols, including:

removing, by a Provider Edge (PE), link layer information from a first data packet according to a first link layer protocol of an input interface of the first data packet when the type of the input interface is a predefined type, and obtaining a second data packet;

transmitting the second data packet to an output interface;

encapsulating, by the PE, the second data packet according to a second link layer protocol of the output interface, obtaining a third data packet, and transmitting the third data packet through the output interface.

In accordance with some embodiments of the present invention, data packets from a specific interface are processed before being transmitting to the output interface, in which the data packets are encapsulated according to the link properties of the output interface before being outputted. In this way, the interworking of local heterogeneous link layer protocols and the smooth upgrading of the network are achieved.

EMBODIMENTS OF THE INVENTION

In order to make it more convenient for those skilled in the art to understand and implement the present invention, preferred embodiments of the present invention are described hereinafter with reference to accompanying drawings.

The present invention can be implemented by combining the technical scheme of local homogeneous link interworking and that of the remote IP-interworking. How to combine these two technical schemes will be illustrated in detail hereinafter.

Figure 1:
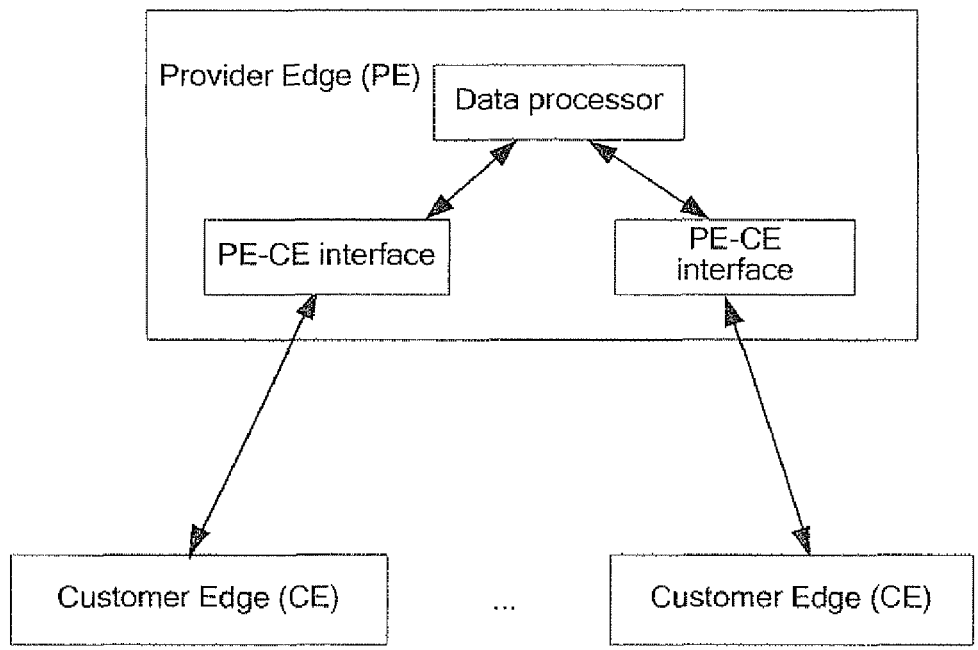
FIG. 1 is a schematic diagram illustrating a communication system which includes CEs and a communication apparatus for interworking of local heterogeneous link layer protocols according to an embodiment of the present invention.

FIG. 1 shows a communication system for interworking of local heterogeneous protocols according to an embodiment of the present invention. As shown in FIG. 1, the communication system for interworking of local heterogeneous protocols includes a PE and at least two CEs. The PE, i.e. the communication apparatus for interworking of local heterogeneous link layer protocols, to be specific, can be a router or a switch running the MPLS protocol. The CEs can be a switch or other similar devices running the FR or ATM protocols. The CEs are connected with the PE. Since multiple CEs are connected with the PE, there are multiple links between the PE and the CEs, and the links can adopt the same link layer protocol or different link layer protocols. The interworking of the two CEs is implemented through the PE.

The PE includes:

PE-CE interfaces, which are interfaces between the PE and the CEs and adopt the same link layer protocol or different link layer protocols, used for receiving or transmitting data packets;

a data processor, connected with the PE-CE interfaces, used for processing the data packets to be communicated between the PE-CE interfaces. Wherein, the data processor can further include:

a de-capsulating unit, used for removing link layer information form a data packet received from an input interface according to the input interface type;

a capsulating unit, used for adding link layer information to a data packet to be transmitted to an output interface according to the output interface type.

Figure 2:
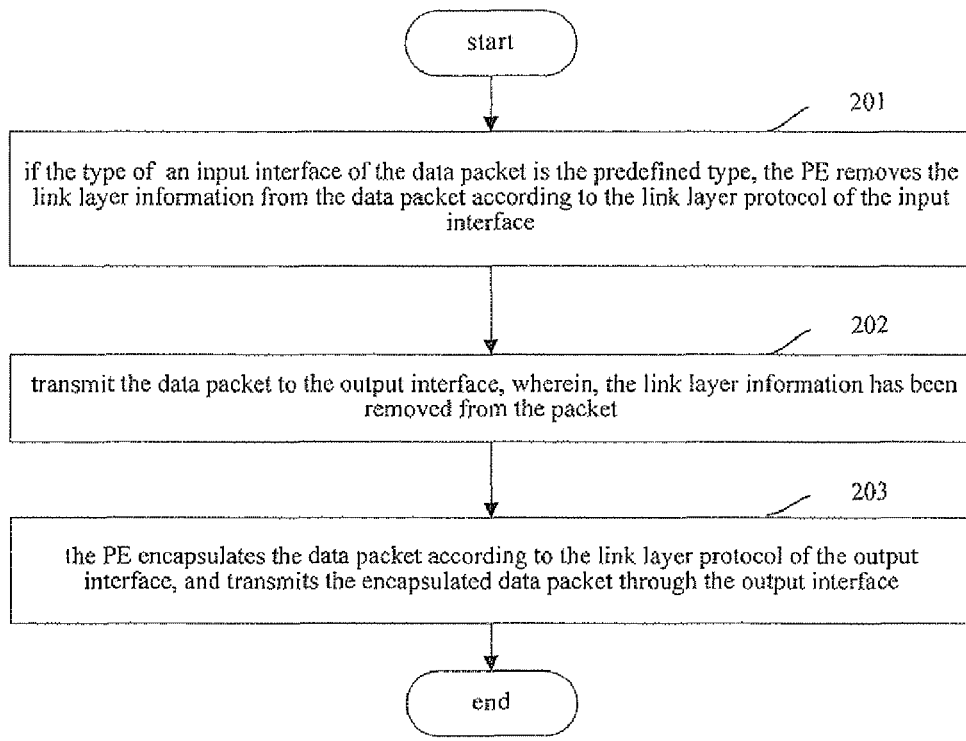
FIG. 2 is an overall flowchart of the communication method according to an embodiment of the present invention.

The overall flow of the communication method for interworking of local heterogeneous link layer protocols is shown in FIG. 2, including the following steps:

Step 201, if the type of the input interface of the data packet is the predefined type, the PE removes the link layer information from a data packet according to the link layer protocol of the input interface;

Step 202, transmit, to the output interface, the data packet whose link layer information has been removed;

Step 203, the PE encapsulates the data packet according to the link layer protocol of the output interface, and transmits the encapsulated data packet through the output interface.

The predefined type is configured to identify the input interface and the output interface when the input interface and the output interface adopt different link layer protocols. The predefined type may be an interworking type of heterogeneous link layer protocols based on the IP-interworking (e.g., Translational Cross Connect (TCC) of the IP-interworking). The PE pre-configures the PE-CE interface which requires the local interworking of heterogeneous link layer protocols as the predefined type according to the interworking requirement of local heterogeneous links.

In addition, the link layer protocols mentioned above include: ATM, FR, Ethernet, Point-to-Point Protocol (PPP), Virtual Local Area Network (VLAN), High Data Link Control (HDLC), etc.

The interworking situations between these protocols are shown in the following Table, wherein √ indicates the interworking is allowed.

|          | ATM | FR | Ethernet | PPP | VLAN | HDLC |
|----------|-----|----|----------|-----|------|------|
| ATM      |     |    |          |     |      |      |
| FR       | ✓   |    |          |     |      |      |
| Ethernet | ✓   | ✓  |          |     |      |      |
| PPP      | ✓   | ✓  | ✓        |     |      |      |
| VLAN     | ✓   | ✓  | ✓        | ✓   |      |      |
| HDLC     | ✓   | ✓  | ✓        | ✓   | ✓    |      |

The communication method for interworking of local heterogeneous link layer protocols in accordance with this embodiment is hereinafter described.

Before the PE processes a data packet according to a configured type, some configurations are required. In the present embodiment, the configurations include:

first, extend the configuration of a CCC in the PE to allow the interworking of heterogeneous link layer protocols;

then, configure a local IP-interworking mode of CCC, i.e., configuring the PE-CE interfaces of two heterogeneous protocols which need interworking as the IP-interworking TCC type;

a control plane in the PE configures the encapsulation types of the two PE-CE interfaces to be TCC, and issues two interface forwarding items to the interface forwarding table, wherein the input interface of the forwarding item is one PE-CE interface and the output interface of the forwarding item is the other PE-CE interface.

In addition, Address Resolution Protocol (ARP) requires the configuration of the IP address of the peer CE while the IP addresses of the two CEs belong to the same segment, which are not allowed to be configured in one device. Therefore, on one of the above-mentioned two heterogeneous protocols, the physical address of the peer CE is dynamically configured through the ARP. On the other protocol, however, the physical address of the peer CE is statically configured or is obtained via broadcast. Other negotiation ways in the link layer are the same as those in a remote way of the IP-interworking. For example, to implement the interworking between the ATM and the FR, in order to dynamically learn the physical address of the peer side only one of the ATM and FR protocols can be selected to configure an IP address. Dynamical link layer negotiation can be conducted on different PEs simultaneously. After the above-mentioned configurations, the two CEs directly perform the link layer negotiations with the local PE and then establish the link. The ARP is unnecessary for Point-to-Point interfaces. After the link layer negotiation, the IP layer negotiation and normal transmission of the IP data packet on the CEs can be guaranteed.

Figure 3:
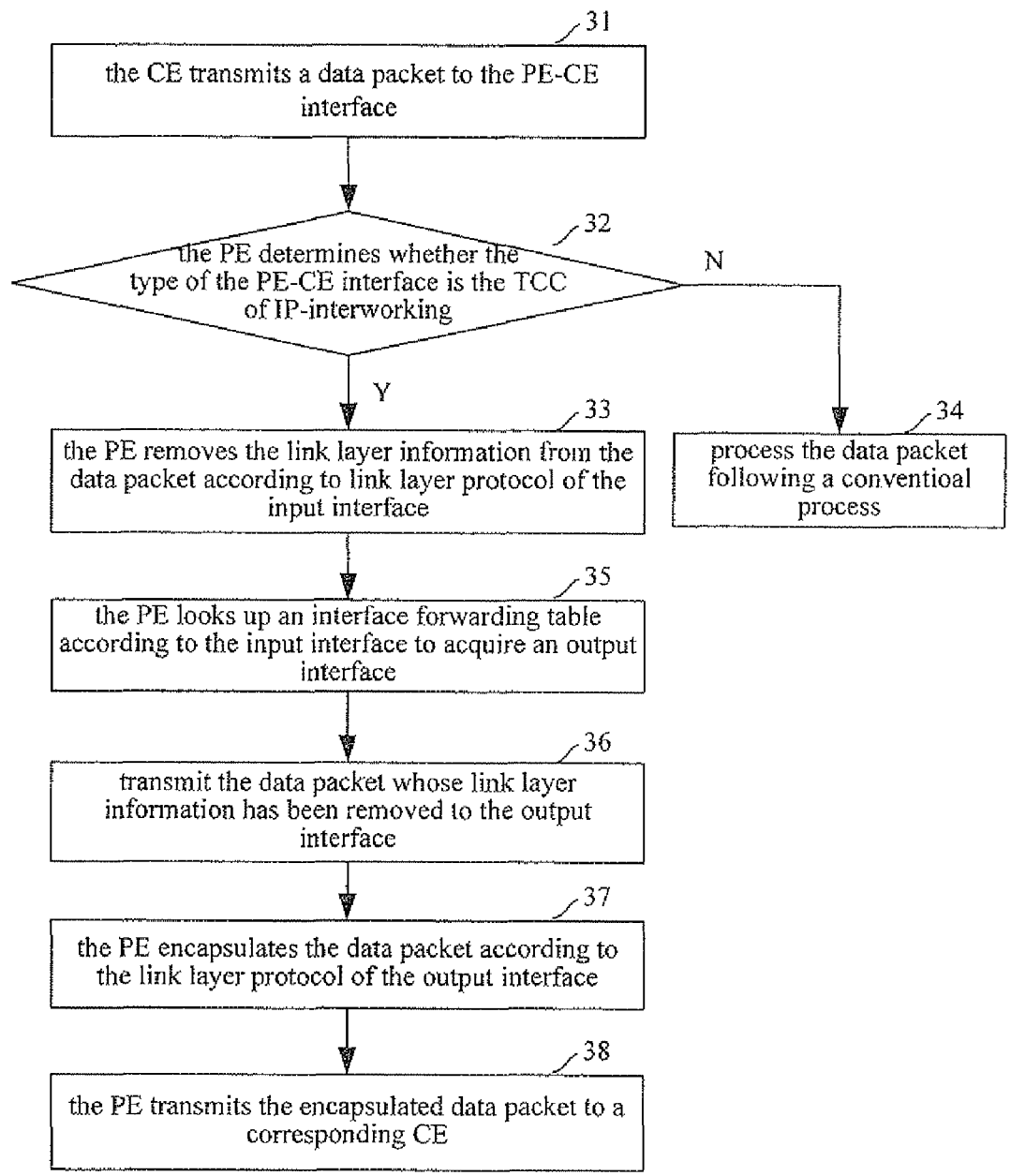
FIG. 3 is a flowchart according to an embodiment of the present invention.

A processing flow of a data packet according to the configured type after the above-mentioned configurations is shown in FIG. 3.

Step 31: the CE transmits a data packet to the PE-CE interface.

Step 32: the PE determines whether the type of the PE-CE interface, i.e., the input interface of the data packet, is the TCC of IP-interworking, if the type of the PE-CE interface is the TCC of IP-interworking, execute Step 33; otherwise, execute Step 34.

Step 33: the PE removes the link layer information from the data packet according to link layer protocol of the input interface, and then execute Step 35.

Step 34: if the input interface of the data packet is not the predefined type, process the data packet following a conventional process, and end the current procedure.

Step 35: the PE looks up the interface forwarding table according to the input interface to acquire an output interface.

Step 36: transmit, to the output interface, the data packet from which the link layer information has been removed.

Step 37: the PE encapsulates the data packet according to the link layer protocol of the output interface.

Step 38: the PE transmits the encapsulated data packet to the corresponding CE.

The present invention is applicable to networks and equipment which adopt the MPLS L2 VPN technique.

The networking scheme with the interworking of local heterogeneous link layer protocols makes it possible to implement reconstructions and smooth upgrading of old networks. As a result, an old network and a new network can be used simultaneously. Meanwhile, it provides a new value-added service for the operator.

The method and the apparatus of the present invention can be modified appropriately during a specific implementation to meet the requirements of specific cases. It can be understood by those skilled in the art that the specific embodiments according to the present invention are just demonstrative, and are not for use in confining the protection scope of the present invention.

What is claimed is:

1. A communication apparatus comprising:
a first interface, configured to receive/transmit a first data packet and acquire the physical address of a peer side through an Address Resolution Protocol (ARP), connected with a first link which adopts a first link layer protocol;
wherein the communication apparatus is a provider edge (PE), the PE removes link layer information from the first data packet according to the first link layer protocol of the first interface when the first interface is an input interface and a predefined type;
a second interface, configured to receive/transmit and encapsulate a second data packet and acquire the physical address of the peer side through static configuration or broadcast, connected with a second link which adopts a second link layer protocol of an output interface;
a data processor, connected with the first interface and the second interface, configured to process the data packet between the first interface and the second interface according to types of the first interface and the second interface;
where the communication apparatus is configured to interwork local heterogeneous link layer protocols;
and the first link layer protocol is different from the second link layer protocol.

2. The apparatus according to claim 1, wherein the data processor comprises:
a de-encapsulating unit, configured to remove link layer information from the data packet according to the first link layer protocol; and
an encapsulating unit, configured to add link layer information to the data packet according to the second link layer protocol.

3. The apparatus according to claim 2, wherein, the communication apparatus is applied in Multi Protocol Label Switching (MPLS L2VPN).

4. The apparatus according to claim 1, the first link layer protocol includes: Asynchronous Transfer Mode (ATM), Frame Relay (FR), Ethernet, Point-to-Point Protocol (PPP), Virtual Local Area Network (VLAN) or High Data Link Control (HDLC).

5. The apparatus according to claim 1, the second link layer protocol includes: Asynchronous Transfer Mode (ATM), Frame Relay (FR), Ethernet, Point-to-Point Protocol (PPP), Virtual Local Area Network (VLAN) or High Data Link Control (HDLC).

6. The apparatus according to claim 1, wherein the predefined type is an interworking type of heterogeneous link layer protocols based on the IP-interworking.

7. A communication method comprising:
a link layer protocol in a Provider Edge (PE) acquiring a physical address of a peer side through an Address Resolution Protocol (ARP), and another link layer protocol acquiring the physical address of the peer side through static configuration or broadcast;
removing, the Provider Edge (PE), link layer information from a first data packet according to a first link layer protocol of an input interface of the first data packet when the type of the input interface is a predefined type, and obtaining a second data packet;
transmitting the second data packet to an output interface; and
encapsulating the second data packet according to a second link layer protocol of the output interface, obtaining a third data packet, and transmitting the third data packet through the output interface.

8. The method according to claim 7, before the process of transmitting the second data packet to an output interface, the method further comprises:
looking up, by the PE, an interface forwarding table according to the input interface, and acquiring the output interface.

9. The method according to claim 7, wherein the link layer protocol include: Asynchronous Transfer Mode (ATM), Frame Relay (FR), Ethernet, Point-to-Point Protocol (PPP), Virtual Local Area Network (VLAN) or High Data Link Control (HDLC).

10. The method according to claim 7, further comprises:
when the input interface of the first data packet is not the predefined type, processing the first data packet in a conventional way.

11. The method according to claim 7, wherein the predefined type includes a heterogeneous link interworking type based on IP-interworking.

12. The method according to claim 7, further comprising:
configuring, by the PE, a predetermined interface as the predefined type.

13. A communication method for local heterogeneous link layer protocols, comprising:
one link layer protocol in the PE acquiring the physical address of a peer side through an Address Resolution Protocol (ARP), and another link layer protocol acquiring the physical address of the peer side through static configuration or broadcast;
removing, by a Provider Edge (PE), link layer information from a first data packet according to a first link layer protocol of an input interface of the first data packet when the type of the input interface is a predefined type, and obtaining a second data packet;
transmitting the second data packet to an output interface;
encapsulating the second data packet according to a second link layer protocol of the output interface, obtaining a third data packet, and transmitting the third data packet through the output interface.

14. The method according to claim 13, wherein, the MPLS L2VPN technique is adopted in the PE.

* * * * *